3,832,194
BINDER FOR HIGH ALUMINA REFRACTORY BRICK

Stanley Ronald Pavlica, Irwin, and Ernest Paul Weaver, Pittsburgh, Pa., assignors to Dresser Industries, Inc., Dallas, Tex.
No Drawing. Filed Mar. 2, 1973, Ser. No. 337,326
Int. Cl. C04b 35/10
U.S. Cl. 106—65                                              6 Claims

ABSTRACT OF THE DISCLOSURE

A non-basic refractory brick with a binder consisting essentially of either chromium lignosulfonate or aluminum lignosulfonate.

---

Refractory products are comprised of ceramic materials and are used to line furnaces and high temperature vessels. Refractories are provided in a variety of physical forms such as shapes and monoliths which include plastics, ramming mixes, gunning mixes, casting mixes, etc. shapes, usually brick, may be ceramically bonded by burning at elevated temperatures or may be chemically bonded with various chemical binders which set upon drying or curing at relatively low temperatures. Monolithic refractory products, those shaped within the furnace, almost always have a chemical binder.

The refractory products may be comprised of refractory aggregates such as alumina, crude and calcined bauxite, kyanite, crude and calcined fire clay, zirconia, zircon and other non-basic refractory aggregates well known in the refractories art.

Binders used in refractory products include, for example, hydraulic cements, waste sulfite liquors, epsom salts, sodium silicate, phosphoric acid, sodium phosphate salts and many others.

High alumina refractories are generally classified by their $Al_2O_3$ content in groups having, approximately, 50, 60, 70, 80, 90, or 99% $Al_2O_3$ by analysis. Those containing 50 to 90% of $Al_2O_3$ are made by blending various high alumina refractory materials, while those of 99% content are made from high purity alumina. The common high alumina refractory materials and their typical $Al_2O_3$ contents are calcined alumina, such as tabular, 99%; calcined South American bauxite, 88%; calcined Alabama bauxite, 74%; calcined diaspore, 76%; burley diaspore, 48 and 58%; and kyanite, 56%. All of these materials are chemically compatible and accordingly they can be blended to provide almost any desired resultant alumina content. Further adjustment is sometimes accomplished by including minor amounts of clay or silica. Thus, high alumina refractory shapes is intended to mean shapes analyzing at least 50% $Al_2O_3$ by analysis.

It is among the objects of the present invention to provide a novel binder for non-basic, particularly high alumina, refractory brick to provide an improvement in pressing or working characteristics, density and strength.

Briefly, the invention consists of ceramically bonded non-basic refractory shapes made from size graded non-basic refractory particles and from about 0.5 to 5% of an aluminum lignosulfonate or chromium lignosulfonate binding material. The preferred range for the binder is between about 1 and 2%.

Sulfonated lignin-containing materials such as spent, sulfite liquor products have been extensively used in the manufacture and use of cement. Fermented spent sulfite liquor solids or "residuum solids of fermented spent sulfite liquor" (McPherson Pat. No. 3,425,594) comprise a well known type of such products and are disclosed in said patent as useful in indurating compositions for additives to concrete or mortar mixes. The sulfonated lignin materials useful in the present invention have also been used in hydraulic cement compositions. These materials comprise the aluminum or chromium salt of sulfonated lignin-containing materials such as those obtained from the pulping of wood and other lignocellulosic material, for example, spent sulfite liquor obtained from the pulping of wood by the neutral and acid bisulfite process, sulfonated kraft process lignin and sulfonated soda lignin; the metal ion of said salts preferably being present in an amount chemically equivalent to between about 2 and 15% on an oxide basis. Preferably, the chromium is present in amounts between about 3 and 15% and the aluminum between about 2 and 3%. The exact chemical structure or formula for lignin-containing materials is not known; however, partial chemical analyses showing the inorganic metal oxides contained in the binders utilized in the examples is given in Table I below.

TABLE I

| Binder designation | A | B | C | D | E | F |
|---|---|---|---|---|---|---|
| Partial chemical analysis (percent): | | | | | | |
| Alumina ($Al_2O_3$) | 2.6 | 1.9 | | | | |
| Iron oxide ($Fe_2O_3$) | 0.08 | 0.02 | | | | |
| Chromic oxide ($Cr_2O_3$) | | | 3.4 | 5.3 | 6.6 | 14.4 |
| Manganese oxide (MnO) | | | 2.5 | 0.0 | 3.6 | 0.1 |
| Soda ($Na_2O$) | 1.79 | 0.01 | 6.61 | 3.92 | 7.25 | 0.4 |
| Potash ($K_2O$) | 0.20 | 0.19 | 0.21 | 0.17 | 0.20 | 0.02 |
| Lithia ($Li_2O$) | 0.01 | 0.01 | 0.02 | 0.02 | 0.02 | 0.02 |
| Ash content (solids basis) | 1.25 | 6.5 | 27.0 | 16.8 | 32.3 | 18.1 |
| ph value | 3.9 | 3.6 | 5.2 | 3.6 | 3.0 | 3.5 |

In the following examples, the standard power press method of making refractory brick was employed. The components were crushed and thoroughly blended together to give a typical brick making grind wherein from about 15 to 25% of the refractory material is minus 10 plus 28 mesh, about 20 to 35% is minus 28 plus 65 mesh and balance is minus 65 mesh.

About 1 to 6% by weight of water was added to alumina mixtures consisting of about 75% tabular alumina, 15% calcined alumina, 5% potter's flint and 5% volatilized silica. The particular binder utilized in each of the examples 1 through 9 is set forth in Table II below. After batch mixing, the material was pressed into brick, 9 x 4½ x 2½ inches, at between 8 and 10,000 p.s.i. The shapes were removed from the press and subsequently

TABLE II

| Mixes | 1 | 2 | 3 | 4 | 5 | 6 | 7 | 8 | 9 |
|---|---|---|---|---|---|---|---|---|---|
| Binder and percent | C-1% | C-2% | D-1% | E-2% | F-1% | A-2% | B-1% | D-1% | A-1% |
| Density, p.c.f. | 192 | 195 | 195 | 193 | 190 | 194 | 194 | 193 | 183 |
| Modulus of rupture: | | | | | | | | | |
| At room temperature | 4,910 | 5,170 | 5,030 | 5,050 | 3,670 | 5,230 | 4,670 | 5,220 | 3,080 |
| At 2,700° F | 2,450 | 2,720 | 2,810 | 2,710 | 2,380 | 2,530 | 2,970 | 2,970 | 1,600 | fired for 10 hours at about 2730° F.

As can be seen from the above, all of the brick can be characterized as having a high density and also a high strength as measured by the modulus of rupture test at both room temperature and elevated temperatures. It should be understood that high alumina mixtures, analyzing at least about 50% $Al_2O_3$, other than those described above can be utilized in accordance with this invention. That is, the high alumina materials are ground, screened and blended to give the desired alumina content with the remainder consisting essentially of the other natural constituents of the ores used. The exact screen sizing to be used is dependent upon such factors as the raw materials used and the purpose for which the refractory is to be put, but this is a matter well within the knowledge and skill of those familiar with the refractory field. The binders of the invention may also be utilized to make fireclay, zircon, zirconia and other non-basic refractory brick.

In the foregoing, all part and percentages are by weight. All chemical analyses are on the basis of an oxide analyses. All sizing is according to the Tyler standard sieve series.

Having thus described the invention in detail and with sufficient particularity as to enable those skilled in the art to practice it, what is desired to have protected by Letters Patent is set forth in the following claims.

We claim:

1. In a refractory brick containing non-basic refractory particles, the improvement comprising said particles being bonded with at least one binder material selected from the group consisting of chromium lignosulfonate and aluminum lignosulfonate.

2. A brick according to claim 1 in which said binder is present in amounts between about 0.5 and 5%, by weight.

3. A brick according to claim 1 in which the binder is present in amounts between about 1 and 2%, by weight.

4. A brick according to claim 1 in which the aluminum in the binder is present in amounts between about 2 and 3%, by weight, on an oxide basis.

5. A brick according to claim 1 in which the chromium in the binder is present in amounts between about 3 and 15%, by weight, on an oxide basis.

6. A brick according to claim 1 which analyzes at least 50%, by weight, $Al_2O_3$.

References Cited

UNITED STATES PATENTS

| 2,569,430 | 9/1951 | Schroeder et al. | 106—65 |
| 3,126,291 | 3/1964 | King et al. | 106—123 R |

JAMES E. POER, Primary Examiner

U.S. Cl. X.R.

106—66